United States Patent Office 2,719,128
Patented Sept. 27, 1955

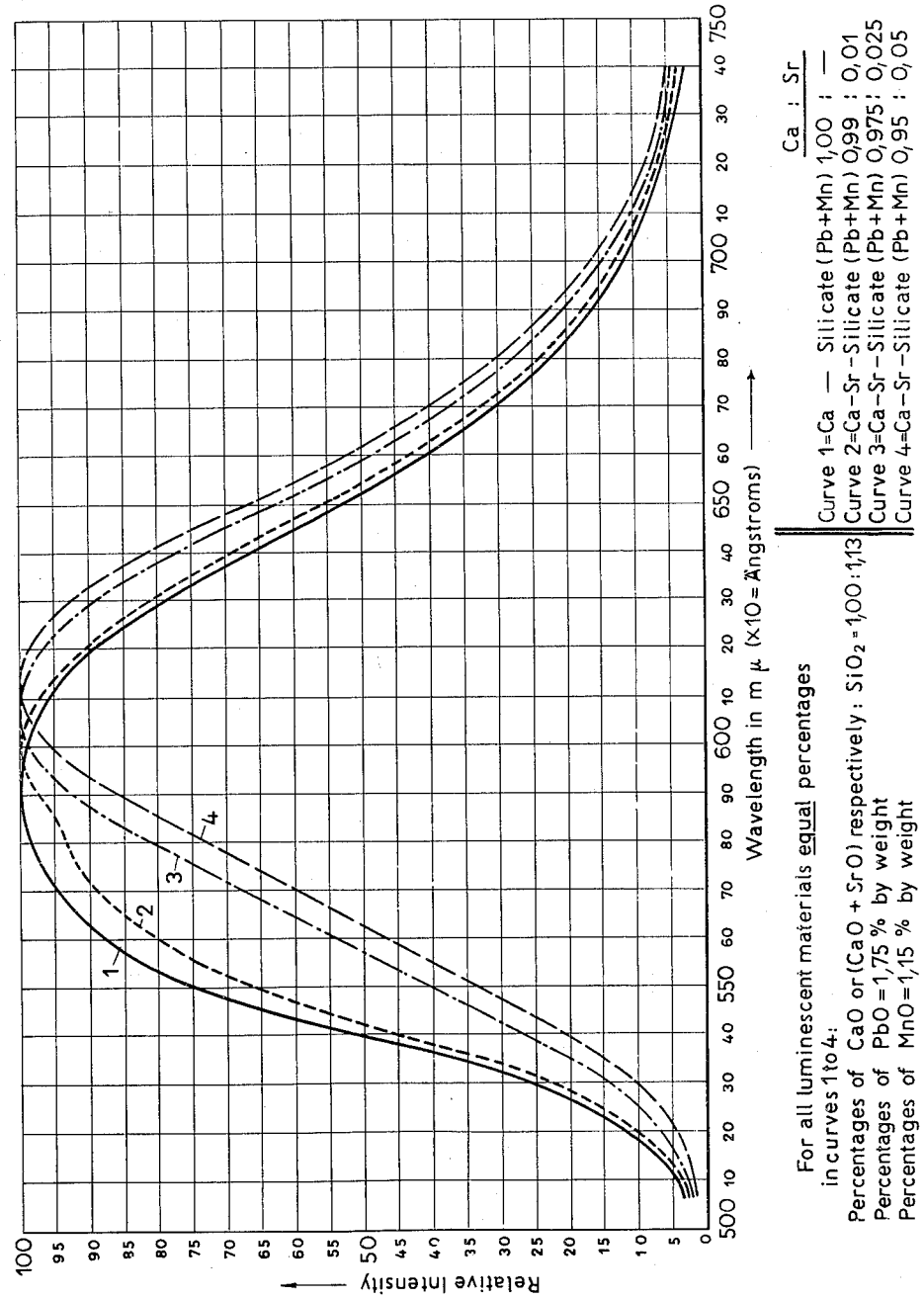

2,719,128

LUMINESCENT MATERIAL

Georg Kressin, Berlin-Frohnau, Germany, assignor to Patent-Treuhand-Gesellschaft für Elektrische Glühlampen m. b. H., Heidenheim (Brenz), Germany Application May 11, 1954, Serial No. 429,088

Claims priority, application Germany June 21, 1950

11 Claims. (Cl. 252—301.4)

The present invention relates to a novel and useful luminescent material adapted to be excited by ultraviolet rays, X-rays or cathode rays, which luminescent material is particularly suitable for electric discharge lamps such as low pressure mercury fluorescent tubes by coating the inner wall thereof with the luminescent materials of the present invention to provide a superior low pressure mercury discharge lamp.

The luminescent materials of the present invention may also be applied on the outer wall of the bulb or on a screen in front of the discharge lamp. In this case, the envelope of the discharge lamp must be capable of transmitting the exciting radiation.

The present case is a continuation-in-part of my copending application, Serial No. 232,655, filed June 20, 1951 for "Luminescent Material," now abandoned.

Phosphors which in general consist of a major proportion of a base material or matrix and a minor proportion of another material called an activator and consisting of one or more substances which act as the activator have been produced wherein the matrix consists of calcium silicate and the activator consists of lead and manganese.

Although the red emission of such phosphor is relatively high as compared to other known phosphors, the red emission is still not sufficiently intense in the longer red wave lengths for many purposes and the percentage of shorter wave length emission in the yellow-green is also relatively high. Increased red emission is obtained in such calcium-silicate phosphors by increasing the manganese percentage of the lead and manganese activators.

However, such luminescent materials having a high percentage of manganese show a reduced stability of lighting intensity and have the further disadvantage that they are difficult to prepare due to the high percentage of manganese. Moreover, such phosphors tend to have a characteristic brown coloring caused by the increased amount of heavy metal therein.

It is therefore a primary object of the present invention to provide a novel luminescent material or phosphor which exhibits a marked increase in red emission with a corresponding decrease in yellow-green emission.

It is another object of the present invention to provide novel luminescent material which has an increased red emission as compared to calcium-silicate phosphors without increasing the content of manganese in the phosphor.

It is yet another object of the present invention to provide coated low pressure mercury discharge lamps coated with the luminescent material of the present invention and thereby having improved red emission.

It is a further object of the present invention to provide a process of producing the novel phosphors of the present invention.

It is still a further object of the present invention to provide colorless or substantially colorless phosphors having a strong red emission.

As a further object, the present invention comprises the production of mixed crystals of strontium silicate and calcium silicate activated by lead and manganese which upon excitation by ultra-violet rays, X-rays or cathode rays luminesce with a high red emission.

Other objects and advantages of the present invention will be apparent from the further reading of the specification and of the appended claims.

With the above objects in view, the present invention mainly comprises a novel luminescent material adapted to be excited by ultra-violet rays, X-rays and cathode rays to emit light, the luminescent material essentially consisting of lead and manganese activated calcium-strontium-silicate containing between 0.01–0.06 mole strontium per each mole of calcium and strontium and between 1.0–1.25 moles of silica per each mole of calcium and strontium.

According to a preferred embodiment of the present invention the inner wall of low pressure mercury discharge lamps are coated with the luminescent material of the present invention. This coating may be carried out in the normal manner for coating tube or bulb walls with phosphors.

The amount of lead and manganese as activators in the phosphor may vary within relatively wide limits within which the concentration of activators in known phosphors may vary. However, it is a primary advantage of the present invention that the amount of heavy metal activator in the phosphors of the present invention may be kept low while achieving a strong red emission. It is therefore preferred to maintain the amount of lead and manganese to within 1–3% by weight of each as compared to the weight of the entire phosphor. Most preferably, the amount of lead in the form of lead oxide in the phosphor is about 1.6% by weight and the amount of manganese in the form of manganese carbonate is 2.4% by weight of the entire phosphor.

The method of manufacturing the luminescent materials of the present invention mainly comprises the steps of mixing calcium and strontium compounds, namely the oxides or compounds which form the oxides upon heating, i. e., the carbonates, with silica and with lead and manganese compounds. The ratio of strontium compound in the mixture is between 0.01–0.06 mole of the strontium compound per mole of the strontium compound plus the calcium compound. In other words there is between 0.01–0.06 mole of strontium to about 0.99–0.94 mole of calcium. The amount of silicate in the mixture is between 1–1.25 moles of silica per each mole of calcium and strontium. Preferably the mixture consists of 0.95 mole of calcium:0.05 mole of strontium:1.1 moles of silica. Another preferred composition consists of 0.973 mole of calcium:0.027 mole of strontium:1.1 moles of silica. Actually in the final calcium-strontium-silicate composition the calcium is in the form of CaO, the strontium is in the form of SrO and the silica of course as $SiO_2$.

The lead compound with which the calcium compound, the strontium compound and the silica are mixed is preferably lead oxide. The manganese compound is preferably manganese oxide or manganese carbonate, and most preferably manganese carbonate.

The formed mixture is then heated to calcining at a temperature such that reaction takes place between the calcium compound, e. g., calcium carbonate, the strontium compound, e. g., strontium carbonate, and the silica to form the calcium-strontium-silicate phosphor containing the lead and manganese activators. The heating is preferably carried out in an atmosphere of steam so as to prevent oxidation during heating. Preferably the heating is carried out at a temperature between 1100–1200° C.

It is preferred to alternately heat the mixture, e. g., at about 1100° C., then mill and sift the heated material, and then heat again three additional times at a temperature of about 1100–1200° C. for 1½ hours each time, each heating period being followed by a milling and sifting step.

It has been found that by increasing the percentage of strontium at the same concentration of activators the red portion of the emitted radiation will increase whereas the yellow-green portion decreases; at the same time the emission maximum will be shifted towards the long waves. According to the present invention luminescent materials are obtained by means of the calcium-strontium-silicates which have a considerably higher red proportion of the emission than do calcium silicates having the same concentration of activators.

In order to better illustrate the advantageous results obtained by the novel luminescent phosphors of the present invention, there is herewith attached a drawing consisting of a graph comparing the radiation intensity in arbitrary units of a lead and manganese activated calcium silicate phosphor with lead and manganese activated calcium-strontium-silicate phosphors of different strontium concentration, the concentration of lead and manganese activators always remaining constant.

The emission curves in the annexed diagram show the radiation intensity in arbitrary units depending on the wave-lengths in m$\mu$ ($\times 10$=Angstrom). The curves are delineated for luminescent materials with equal activator-concentration with a percentage of manganese oxides of 1.15% by weight and a percentage of lead oxide of 1.75% by weight. Curve 1 shows the emission of a calcium-silicate (Mn+Pb) without any strontium for the purpose of comparing, curve 2 the emission of a Ca-Sr-silicate (Mn+Pb) with a percentage of Sr of 1 mole percent, curve 3 shows the emission of a Ca-Sr-silicate (Mn+Pb) with a percentage of Sr of 2.5 mole percent and curve 4 the emission of a Ca-Sr-silicate (Mn+Pb) with a percentage of Sr of 5 mole percent.

It may be clearly seen that with a constant activator-concentration, the emission decreases in the yellow-green part and increases in the red part with simultaneous shifting of the emission maximum towards the longer wave-lengths. It is clear from the diagram that by the manufacture of Ca-Sr-silicates activated with (Mn+Pb) according to the present invention luminescent materials are obtained the emission of which is mainly in the red part of the spectrum.

An increase of the red emission by incorporating strontium silicate with a constant activator-concentration is, of course, only possible within the range of formation of mixed crystals between calcium silicate and strontium silicate. The maximum limit for the formation of mixed crystals is about 6 mole percent. A further addition of strontium silicate to the luminescent material has no influence on it but causes a decreasing of the light intensity. Although any amount of strontium silicate in the phosphor increases the percentage of red emission thereof, a marked increase occurs within an amount of 1 mole percent of strontium-silicate and this is therefore the minimum amount of strontium-silicate in the composition of the present invention.

The following examples are additionally illustrative of the present invention and are not to be considered as limiting the scope thereof.

*Example I*

0.973 mole of calcium carbonate and 0.027 mole of strontium carbonate, previously dried at a temperature of about 150° C., are intimately mixed with 1.1 moles SiO₂ to which are added 1.6% by weight of lead oxide and 2.4% by weight of manganese carbonate. This intimate mixture is heated in a stream of steam at a temperature of about 1100–1200° C. several times, each heating period being followed by a milling and sifting operation. A very fine luminescent powder of Pb—Mn activated Ca-Sr-silicate exhibiting a high luminous flux of yellowish radiation is produced.

*Example II*

0.95 mole of calcium carbonate and 0.05 mole of strontium carbonate, previously dried at a temperature of about 150° C., are intimately mixed with 1.1 moles SiO₂ to which are added 1.6% by weight of lead oxide and 2.4% by weight of manganese carbonate. This intimate mixture is heated in a stream of steam at a temperature of about 1100–1200° C. several times, each heating period being followed by a milling and sifting operation. A very fine luminescent powder of Pb—Mn activated Ca-Sr-silicate exhibiting a high luminous flux of red radiation is produced.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A novel luminescent material adapted to be excited by ultraviolet rays, X-rays and cathode rays to emit light, said luminescent material essentially consisting of lead and manganese activated calcium-strontium-silicate containing between 0.01–0.06 mole strontium per each mole of calcium and strontium and between 1.0–1.25 moles of silica per each mole of calcium and strontium; and containing between 1–3% each of lead and manganese.

2. A novel luminescent material adapted to be excited by ultraviolet rays, X-rays and cathode rays to emit light, said luminescent material essentially consisting of lead and manganese activated calcium-strontium-silicate containing 0.05 mole strontium per each mole of calcium and strontium and 1.1 moles of silica per each mole of calcium and strontium; and containing between 1–3% each of lead and manganese.

3. A novel luminescent material adapted to be excited by ultraviolet rays, X-rays and cathode rays to emit light, said luminescent material essentially consisting of lead and manganese activated calcium-strontium-silicate containing 0.027 mole strontium per each mole of calcium and strontium and 1.1 moles of silica per each mole of calcium and strontium; and containing between 1–3% each of lead and manganese.

4. A novel luminescent material adapted to be excited by ultraviolet rays, X-rays and cathode rays to emit light, said luminescent material essentially consisting of lead and manganese activated calcium-strontium-silicate containing 0.05 mole strontium per each mole of calcium and strontium and 1.1 moles of silica per each mole of calcium and strontium; and containing about 1.6% lead oxide and 2.4% manganese carbonate.

5. A novel luminescent material adapted to be excited by ultraviolet rays, X-rays and cathode rays to emit light, said luminescent material essentially consisting of lead and manganese activated calcium-strontium-silicate containing 0.027 mole strontium per each mole of calcium and strontium and 1.1 moles of silica per each mole of calcium and strontium; and containing about 1.6% lead oxide and 2.4% manganese carbonate.

6. A process of producing a lead and manganese activated calcium-strontium-silicate phosphor, comprising the steps of forming a mixture of lead oxide, a manganese compound selected from the group consisting of manganese oxide and manganese carbonate, silica and calcium and strontium compounds selected from the group consisting of oxides and compounds producing oxides upon heating, in a ratio of between 0.01–0.06 mole strontium compound per each mole of calcium and strontium compounds, 1.0–1.25 moles silica per each mole of calcium and strontium compounds and 1–3% lead oxide and 1–3% of said manganese compound by weight of said mixture; calcining said mixture at a temperature sufficiently high to cause reaction among said calcium and strontium compounds and said silica, thereby forming a calcium-strontium-silicate phosphor activated by lead and manganese; and recovering said thus formed phosphor.

7. A process of producing a lead and manganese activated calcium-strontium-silicate phosphor, comprising the steps of forming a mixture of lead oxide, a manganese compound selected from the group consisting of manganese oxide and manganese carbonate, silica and calcium and strontium compounds selected from the group consisting of oxides and compounds producing oxides upon heating, in a ratio of between 0.01–0.06 mole strontium compound per each mole of calcium and strontium compounds, 1.0–1.25 moles silica per each mole of calcium and strontium compounds and 1–3% lead oxide and 1–3% of said manganese compound by weight of said mixture; calcining said mixture at a temperature of about 1100–1200° C. so as to cause reaction among said calcium and strontium compounds and said silica, thereby forming a calcium-strontium-silicate phosphor activated by lead and manganese; and recovering said thus formed phosphor.

8. A process of producing a lead and manganese activated calcium-strontium-silicate phosphor, comprising the steps of forming a mixture of lead oxide, a manganese compound selected from the group consisting of manganese oxide and manganese carbonate, silica and calcium and strontium compounds selected from the group consisting of oxides and compounds producing oxides upon heating, in a ratio of between 0.01–0.06 mole strontium compound per each mole of calcium and strontium compounds, 1.0–1.25 moles silica per each mole of calcium and strontium compounds and 1–3% lead oxide and 1–3% of said manganese compound by weight of said mixture; calcining said mixture in an atmosphere of steam at a temperature of about 1100–1200° C. so as to cause reaction among said calcium and strontium compounds and said silica, thereby forming a calcium-strontium-silicate phosphor activated by lead and manganese; and recovering said thus formed phosphor.

9. A process of producing a lead and manganese activated calcium-strontium-silicate phosphor, comprising the steps of intimately mixing calcium carbonate, strontium carbonate and silica in a ratio of 0.01–0.06 mole strontium carbonate per each mole of strontium carbonate and calcium carbonate and 1.0–1.25 moles silica per each mole of strontium carbonate and calcium carbonate; adding to the said mixture between 1–3% lead oxide and 1–3% manganese carbonate by weight of the thus formed mixture; heating said thus formed mixture in an atmosphere of steam at a temperature between about 1100–1200° C., thereby forming a calcium-strontium-silicate phosphor activated by lead and manganese; and recovering the thus formed phosphor.

10. A process of producing a lead and manganese activated calcium-strontium-silicate phosphor, comprising the steps of intimately mixing calcium carbonate, strontium carbonate and silica in a ratio of 0.05 mole strontium carbonate per each mole of strontium carbonate and calcium carbonate and 1.1 moles silica per each mole of strontium carbonate and calcium carbonate; adding to the said mixture 1.6% lead oxide and 2.4% manganese carbonate by weight of the thus formed mixture; heating said thus formed mixture in an atmosphere of steam at a temperature between about 1100–1200° C., thereby forming a calcium-strontium-silicate phosphor activated by lead and manganese; and recovering the thus formed phosphor.

11. A process of producing a lead and manganese activated calcium-strontium-silicate phosphor, comprising the steps of intimately mixing calcium carbonate, strontium carbonate and silica in a ratio of 0.027 mole strontium carbonate per each mole of strontium carbonate and calcium carbonate and 1.1 mole silica per each mole of strontium carbonate and calcium carbonate; adding to the said mixture 1.6% lead oxide and 2.4% manganese carbonate by weight of the thus formed mixture; heating said thus formed mixture in an atmosphere of steam at a temperature between about 1100–1200° C., thereby forming a calcium-strontium-silicate phosphor activated by lead and manganese; and recovering the thus formed phosphor.

References Cited in the file of this patent

UNITED STATES PATENTS

| | | |
|---|---|---|
| 2,445,692 | Porter et al. | July 20, 1948 |
| 2,447,210 | Roberts | Aug. 17, 1948 |
| 2,450,548 | Gisolf et al. | Oct. 5, 1948 |

FOREIGN PATENTS

| | | |
|---|---|---|
| 577,694 | Great Britain | May 28, 1946 |